United States Patent
Budynas (10) Patent No.: US 11,634,019 B2
(45) Date of Patent: Apr. 25, 2023

(54) VEHICLE EXTERIOR SURFACE PROTECTIVE DEVICE

(71) Applicant: Kevin Budynas, Colorado Springs, CO (US)

(72) Inventor: Kevin Budynas, Colorado Springs, CO (US)

( * ) Notice: Subject to any disclaimer, the term of this patent is extended or adjusted under 35 U.S.C. 154(b) by 519 days.

(21) Appl. No.: 16/793,015

(22) Filed: Feb. 18, 2020

(65) Prior Publication Data

US 2021/0252956 A1    Aug. 19, 2021

(51) Int. Cl.
| | |
|---|---|
| *B60J 11/08* | (2006.01) |
| *B32B 7/022* | (2019.01) |
| *B32B 15/06* | (2006.01) |
| *B32B 25/04* | (2006.01) |
| *B32B 15/04* | (2006.01) |

(52) U.S. Cl.
CPC ............ *B60J 11/08* (2013.01); *B32B 7/022* (2019.01); *B32B 15/046* (2013.01); *B32B 15/06* (2013.01); *B32B 25/045* (2013.01); *B32B 2307/558* (2013.01); *B32B 2307/7265* (2013.01); *B32B 2571/00* (2013.01)

(58) Field of Classification Search
None
See application file for complete search history.

(56) References Cited

U.S. PATENT DOCUMENTS

| | | | |
|---|---|---|---|
| D350,322 S | 9/1994 | Carson | |
| 5,615,923 A | 4/1997 | Madison | |
| 6,893,074 B1 | 5/2005 | Wilson | |
| 7,219,616 B2 | 5/2007 | Pritchett | |
| 8,430,445 B1 | 4/2013 | Williams | |
| 9,688,129 B2 | 6/2017 | Mansueto | |
| 10,279,660 B2 | 5/2019 | Nomura | |
| 2009/0301671 A1 | 12/2009 | Locklear | |
| 2017/0021711 A1* | 1/2017 | Mansueto | ................ B60J 11/08 |
| 2017/0259661 A1 | 9/2017 | Helb | |

* cited by examiner

*Primary Examiner* — Chinessa T. Golden (57) ABSTRACT

A vehicle exterior surface protective device for protecting a portion of a vehicle from damage by hail includes a shell, which defines an interior space, and a fastener. The shell is sized to cover a portion of an exterior surface of a vehicle, such as a window and a body panel. A first insert and a second insert are positioned in the interior space, adjacent to a top and a bottom of the shell, respectively. The first insert is at least semirigid and can resist impact deformation. The second insert is resiliently deformable and can dissipate a force from an impact of an object. The fastener is engaged to the shell and is selectively engageable to the vehicle to fixedly position the shell over the portion of the exterior surface. The shell thus positioned protects the portion of the exterior surface from the impact of the object.

19 Claims, 6 Drawing Sheets

VEHICLE EXTERIOR SURFACE PROTECTIVE DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to protective devices and more particularly pertains to a new protective device for protecting a portion of a vehicle from damage by hail.

(2) Description of Related Art Including Information Disclosed Under 37 CFR 1.97 and 1.98

The prior art relates to protective devices. Protective devices for exterior surfaces of vehicles may comprise a tarp, or a covering that comprises impact absorbing material.

BRIEF SUMMARY OF THE INVENTION

An embodiment of the disclosure meets the needs presented above by generally comprising a shell, which defines an interior space, and a fastener. The shell is sized to cover a portion of an exterior surface of a vehicle, such as a window and a body panel. A first insert and a second insert are positioned in the interior space, adjacent to a top and a bottom of the shell, respectively. The first insert is at least semirigid and is configured to resist impact deformation. The second insert is resiliently deformable and is configured to dissipate a force from an impact of an object. The fastener is engaged to the shell and is configured to be selectively engageable to the vehicle to fixedly position the shell over the portion of the exterior surface. The shell thus positioned is configured to protect the portion of the exterior surface from the impact of the object.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 7 thereof, a new protective device embodying the principles and concepts of an embodiment of the disclosure and generally designated by the reference numeral 10 will be described.

As best illustrated in FIGS. 1 through 7, the vehicle exterior surface protective device 10 generally comprises a shell 12, which defines an interior space 14, and a fastener 16. The shell 12 is sized to cover a portion 18 of an exterior surface 20 of a vehicle 22, such as a window and a body panel. The body panel may comprise, for example, a trunk lid or hood of the vehicle 22. The shell 12 has a perimeter 24, which may be shaped substantially complementarily to a circumference 26 of the portion 18 of the exterior surface 20 of the vehicle 22. The shell 12 comprises elastomer so that the shell 12 is substantially impermeable to water.

A first insert 28 and a second insert 30 are positioned in the interior space 14, adjacent to a top 32 and a bottom 34 of the shell 12, respectively. The first insert 28 is at least semirigid and thus is configured to resist impact deformation. The second insert 30 is resiliently deformable and thus is configured to dissipate a force from an impact of an object, such as a hail stone.

The fastener 16 is engaged to the shell 12 and is configured to be selectively engageable to the vehicle 22 to fixedly position the shell 12 over the portion 18 of the exterior surface 20. The shell 12, thus positioned, is configured to protect the portion 18 of the exterior surface 20 from the impact of the object.

Figure 1:
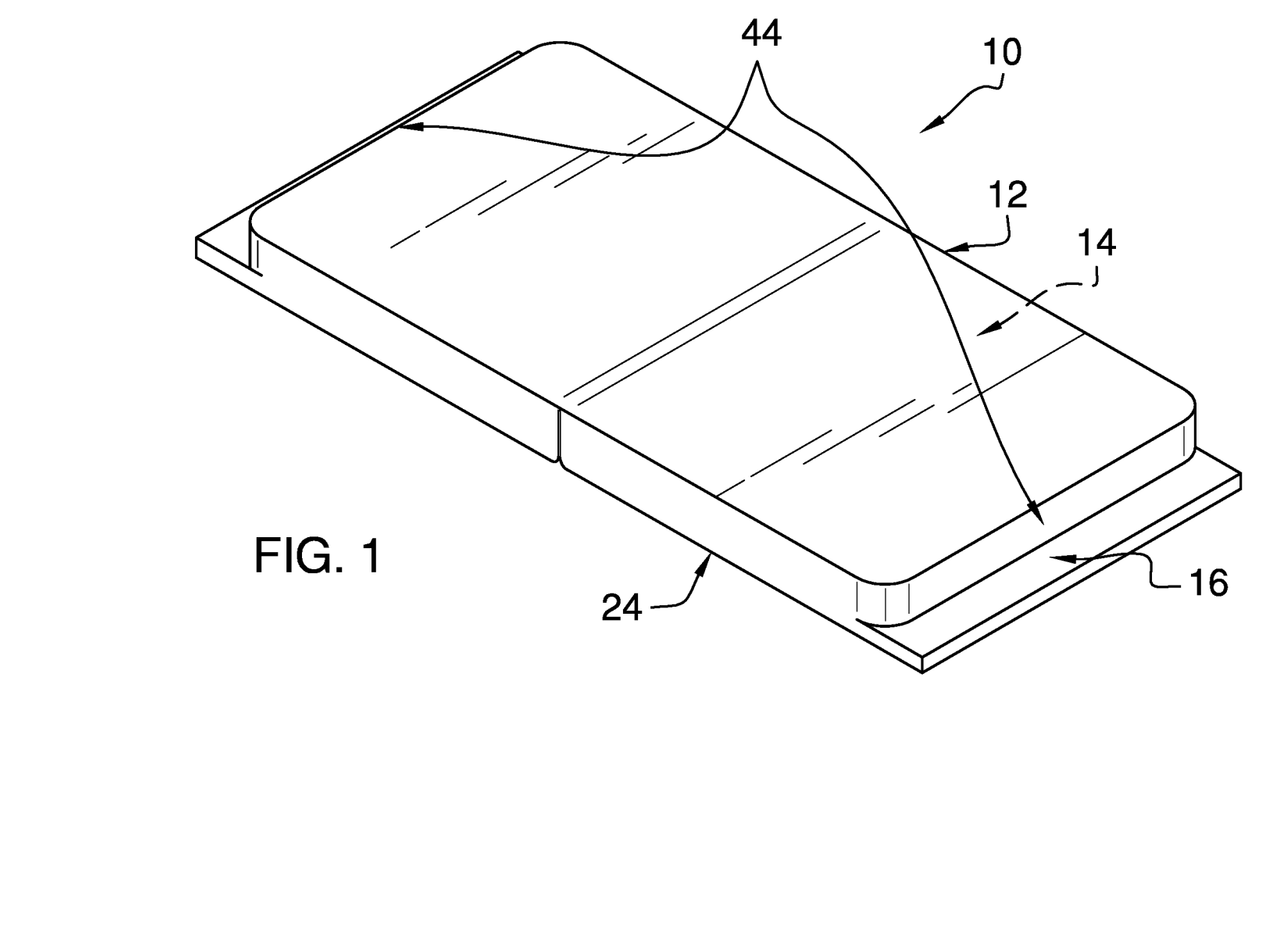
FIG. 1 is an isometric perspective view of a vehicle exterior surface protective device according to an embodiment of the disclosure.
Figure 2:
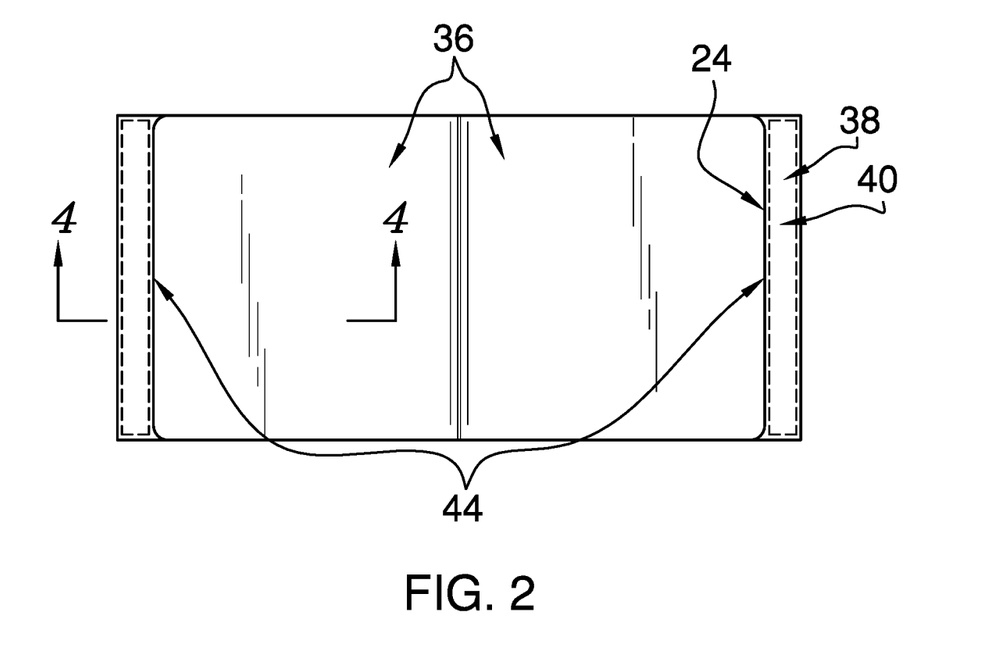
FIG. 2 is a bottom view of an embodiment of the disclosure.
Figure 3:
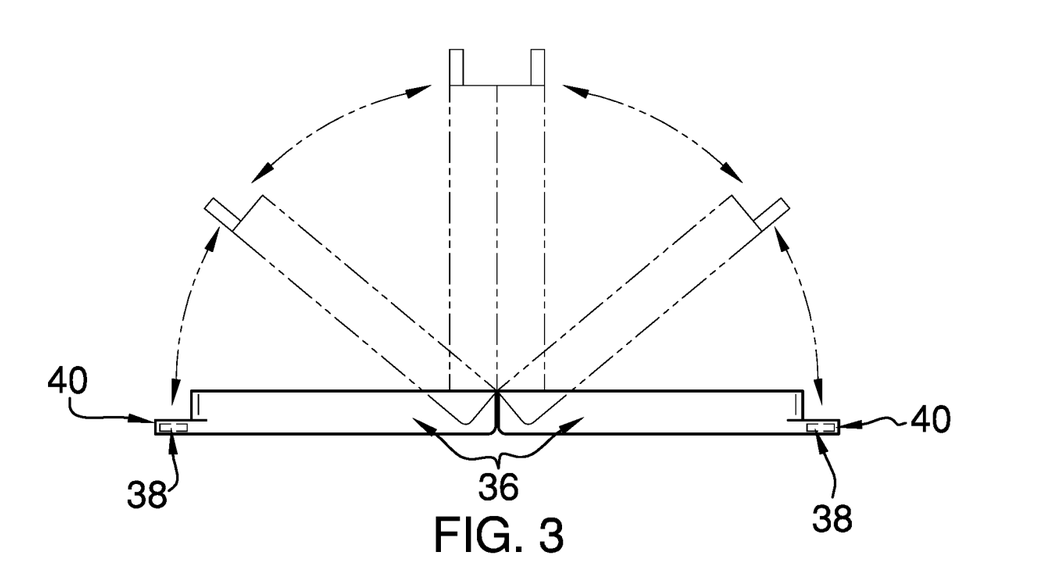
FIG. 3 is a side view of an embodiment of the disclosure.
Figure 4:
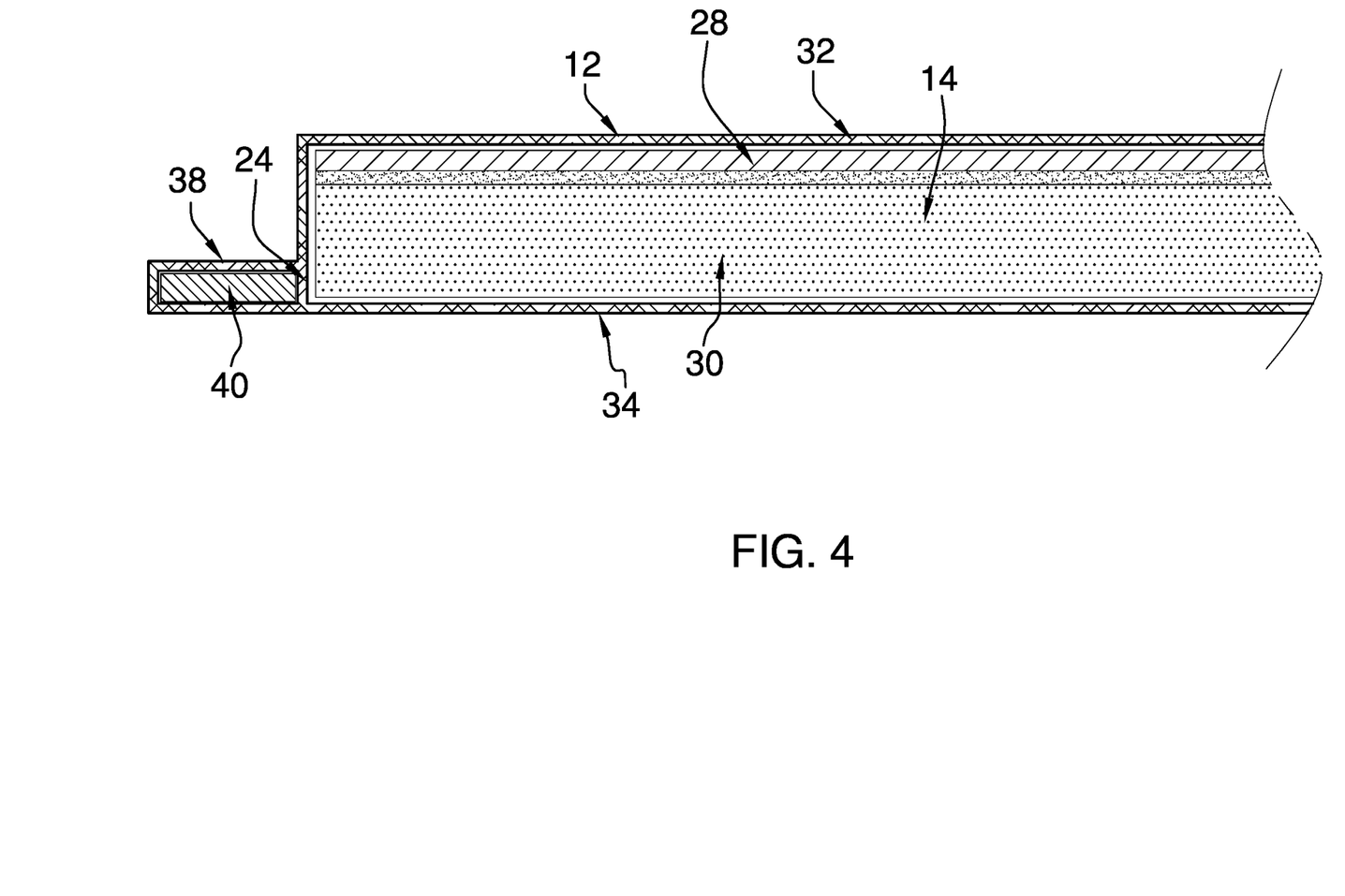
FIG. 4 is a cross-sectional view of an embodiment of the disclosure.
Figure 5:
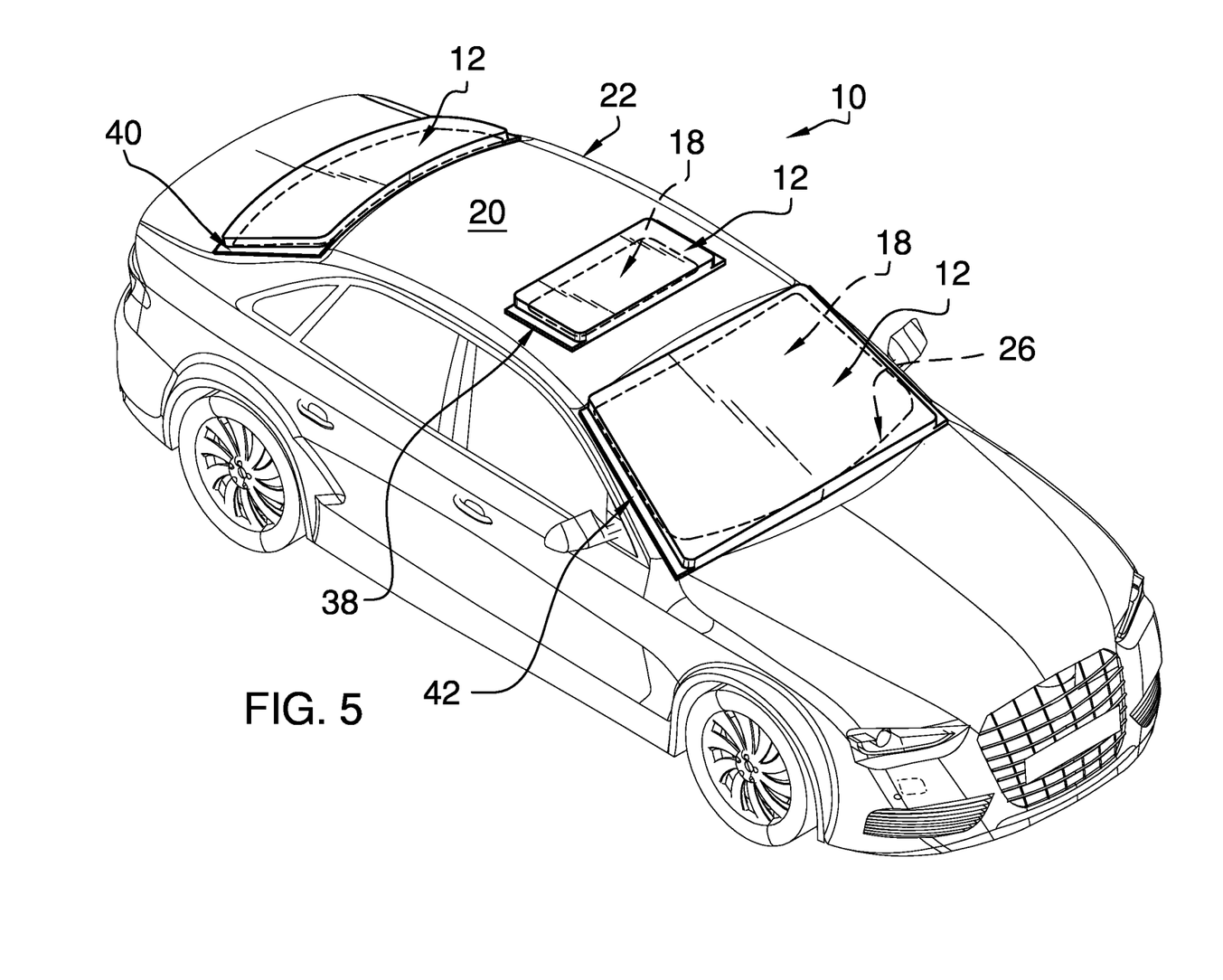
FIG. 5 is an in-use view of an embodiment of the disclosure.
Figure 6:
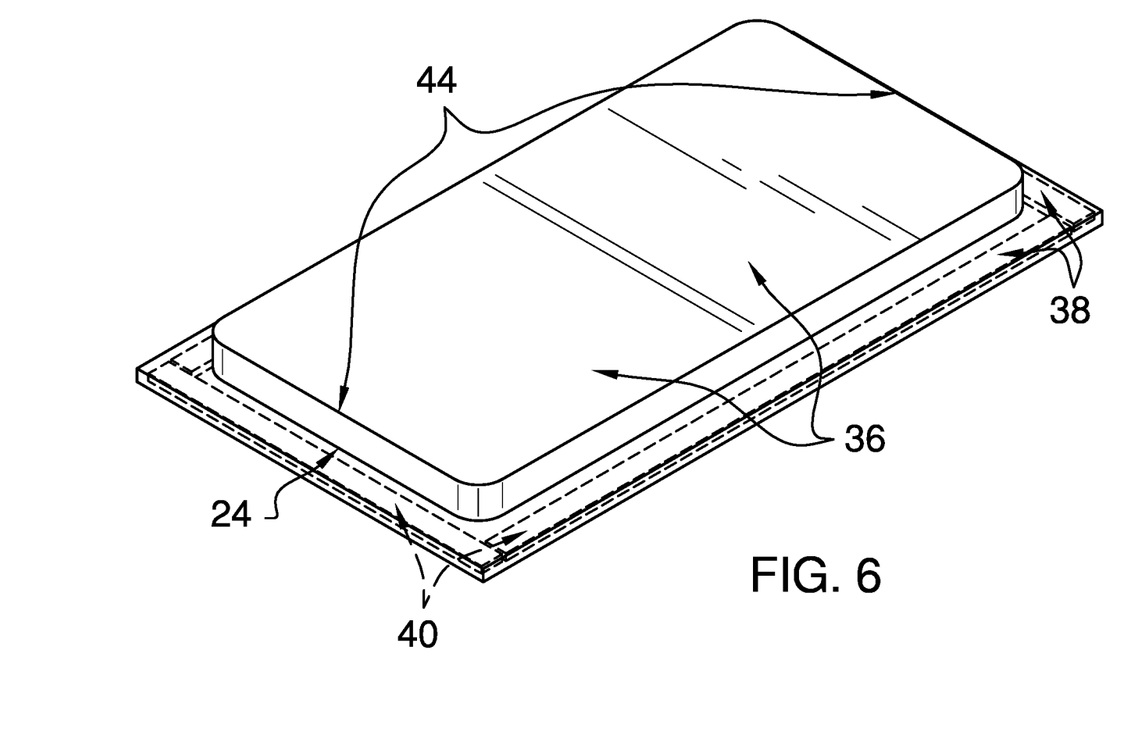
FIG. 6 is an isometric perspective view of an embodiment of the disclosure.

The shell 12 may comprise a plurality of sections 36, as shown in FIG. 1. The sections 36 are hingedly interconnected so that the plurality of sections 36 is selectively foldable from a first configuration to a second configuration. In the first configuration, as shown in FIG. 2, the sections 36 are substantially planarly positioned. In the second configuration, as shown in FIG. 3, at least two of the sections 36 are stacked one upon the other.

The first insert 28 may comprise metal, or other substantially rigid material, such as, but not limited to, plastic, wood, and the like. The second insert 30 may comprise foamed elastomer, or other resilient material, such as, but not limited to, rubber, silicone, and the like.

The first insert 28 may be bonded to the top 32 of the shell 12 to prevent movement of the first insert 28 within the interior space 14. Similarly, the second insert 30 may be bonded to the first insert 28, or the second insert 30 may be bonded to both the first insert 28 and the bottom 34 of the shell 12.

A sleeve 38 is coupled to and extends outwardly from the perimeter 24 of the shell 12. The fastener 16 comprises a magnet 40, which is positioned in the sleeve 38. The magnet 40 is configured to magnetically couple to a ferromagnetic material 42, which is positioned adjacent to the portion 18 of the exterior surface 20 of the vehicle 22, to fixedly position the shell 12 thereover.

The sleeve 38 comprises elastomer so that the sleeve 38 is substantially impermeable to water. The sleeve 38 may comprise two sleeves 38 that are positioned singly on opposed ends 44 of the shell 12. The sleeve 38 also may extend circumferentially around the perimeter 24 of the shell 12, in which case the magnet 40 is configured to substantially sealably couple the shell 12 to the vehicle 22. The shell 12 being substantially sealably coupled to the vehicle 22 prevents entry of air from wind and thus more securely engages the shell 12 to the vehicle 22.

Figure 7:
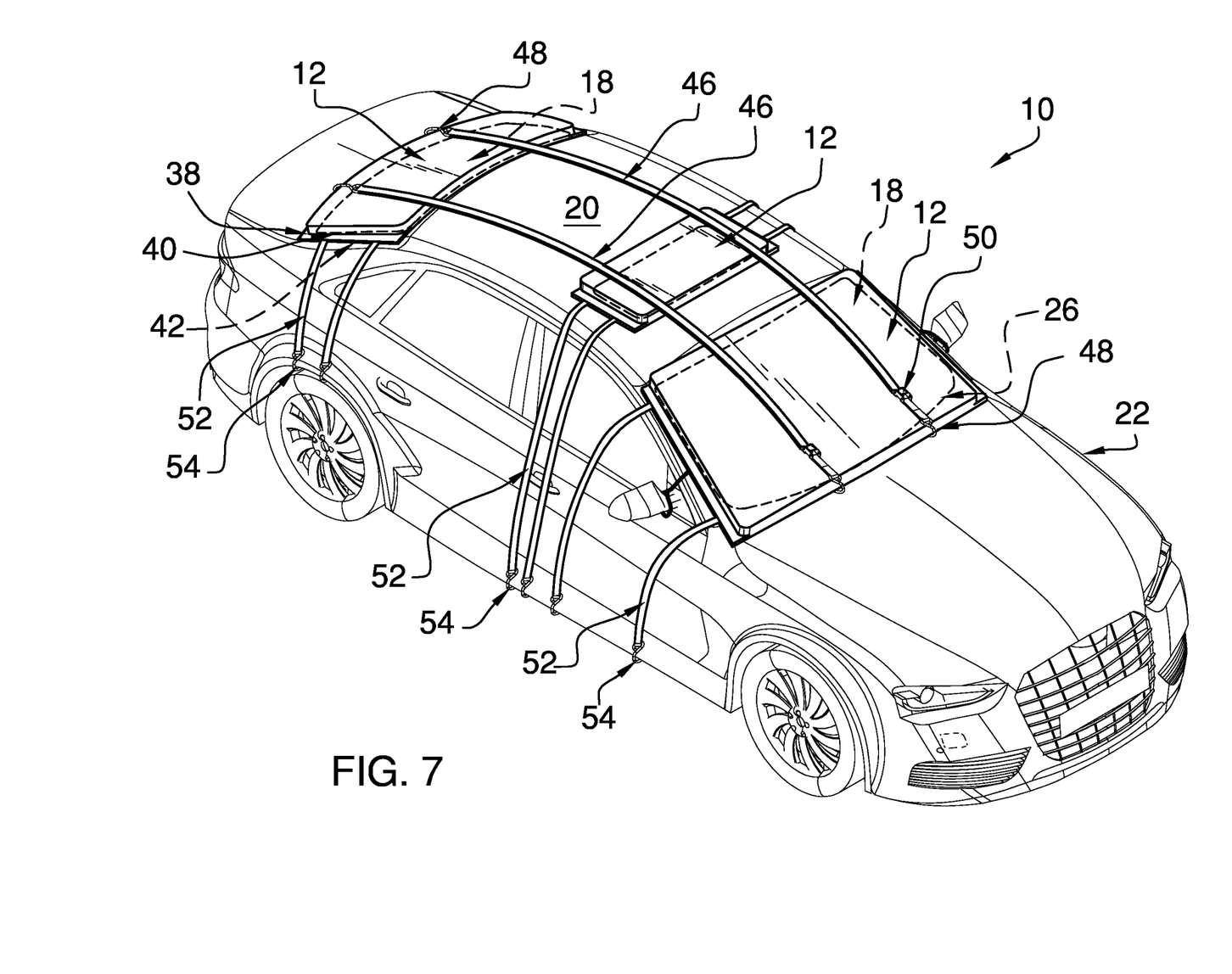
FIG. 7 is an isometric perspective view of alternative embodiments of the disclosure.

The fastener 16 also may comprise an adjustable strap 46, as shown in FIG. 7, wherein three adjustable straps 46 are shown extending over a roof of the vehicle 22. The adjustable strap 46 has a pair of end hooks 48 and a ratchet 50 engaged thereto. Each end hook 48 is configured to selectively engage a respective element of the vehicle 22, such as the hood and the trunk, so that the adjustable strap 46 is positioned over the shell 12. A user is positioned to ratchet the ratchet 50 to tighten the adjustable strap 46 to fixedly position the shell 12 over the portion 18 of the exterior surface 20 of the vehicle 22.

The fastener 16 also may comprise a fixed strap 52. The fixed strap 52 is coupled to and extends from the shell 12, as shown in FIG. 7, wherein each of the shells 12 pictured has at least two fixed straps 52 coupled to and extending from each of the opposed ends 44 of the shell 12. The fixed strap 52 comprises elastomer so that the fixed strap 52 is resiliently stretchable. The fixed strap 52 has a terminal hook 54 coupled thereto distal from the shell 12. The fixed strap 52 is configured to be stretched to position the terminal hook 54 to engage a respective element of the vehicle 22, such as a wheel well, side runner, side mirror, or the like, to fixedly position the shell 12 over the portion 18 of the exterior surface 20 of the vehicle 22.

In use, the shell 12 is positioned over the portion 18 of the exterior surface 20 of the vehicle 22, such as the window or the body panel. The magnet 40 magnetically couples to the ferromagnetic material 42 surrounding the window, or comprising the body panel, so that the shell 12 is fixedly positioned over the portion 18 of the exterior surface 20 of the vehicle 22. The shell 12 thus is configured to protect the window or body panel from damage that could result from an impact, such as from a hail stone.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A vehicle exterior surface protective device comprising:
 a shell defining an interior space, the shell being sized such that the shell is configured for covering a portion of an exterior surface of a vehicle;
 a first insert positioned in the interior space adjacent to a top of the shell, the first insert being resiliently rigid wherein the first insert is configured for resisting impact deformation including impact fracture, wherein the first insert comprises metal;
 a second insert positioned in the interior space adjacent to a bottom of the shell, the second insert being resiliently deformable wherein the first insert is configured for dissipating a force from an impact of an object; and
 a fastener engaged to the shell and being configured to be selectively engageable to the vehicle for fixedly positioning the shell over the portion of the exterior surface, wherein the shell is configured for protecting the portion of the exterior surface from the impact of the object.

2. The vehicle exterior surface protective device of claim 1, wherein the shell comprises a plurality of sections, the sections being hingedly interconnected such that the plurality of sections is selectively foldable from a first configuration, wherein the sections are substantially planarly positioned, to a second configuration, wherein at least two of the sections are stacked one upon the other.

3. The vehicle exterior surface protective device of claim 1, wherein the shell comprises elastomer such that the shell is substantially impermeable to water.

4. The vehicle exterior surface protective device of claim 1, wherein the shell has a perimeter shaped substantially complementarily to a circumference of the portion of the exterior surface of the vehicle.

5. The vehicle exterior surface protective device of claim 1, wherein the first insert is bonded to the top of the shell.

6. The vehicle exterior surface protective device of claim 1, wherein the second insert comprises foamed elastomer.

7. The vehicle exterior surface protective device of claim 1, wherein the second insert is bonded to the first insert.

8. The vehicle exterior surface protective device of claim 7, wherein the second insert is bonded to the bottom of the shell.

9. The vehicle exterior surface protective device of claim 1, further including:
  a sleeve coupled to and extending outwardly from a perimeter of the shell; and
  the fastener comprising a magnet, the magnet being positioned in the sleeve wherein the magnet is configured for magnetically coupling to a ferromagnetic material adjacent to the portion of the exterior surface of the vehicle for fixedly positioning the shell thereover.

10. The vehicle exterior surface protective device of claim 9, wherein the sleeve comprises elastomer such that the sleeve is substantially impermeable to water.

11. The vehicle exterior surface protective device of claim 9, wherein the sleeve extends circumferentially around the perimeter of the shell, wherein the magnet is configured for substantially sealably coupling the shell to the vehicle.

12. The vehicle exterior surface protective device of claim 1, wherein the fastener comprises an adjustable strap, the adjustable strap having a pair of end hooks and a ratchet engaged thereto, wherein each end hook is configured for selectively engaging a respective element of the vehicle such that the adjustable strap is positioned over the shell, positioning a user for ratcheting the ratchet for tightening the adjustable strap for fixedly positioning the shell over the portion of the exterior surface of the vehicle.

13. The vehicle exterior surface protective device of claim 1, wherein the fastener comprises a fixed strap, the fixed strap being coupled to and extending from the shell, the fixed strap comprising elastomer such that the fixed strap is resiliently stretchable, the fixed strap having a terminal hook coupled thereto distal from the shell, wherein the fixed strap is configured for stretching for positioning the terminal hook for engaging a respective element of the vehicle for fixedly positioning the shell over the portion of the exterior surface of the vehicle.

14. A vehicle exterior surface protective device and vehicle combination comprising:
  a vehicle having an exterior surface;
  a shell defining an interior space, the shell being sized such that the shell positionable for covering a portion of the exterior surface of the vehicle;
  a first insert positioned in the interior space adjacent to a top of the shell, the first insert being resiliently rigid wherein the first insert is configured for resisting impact deformation including impact fracture, wherein the first insert comprises metal;
  a second insert positioned in the interior space adjacent to a bottom of the shell, the second insert being resiliently deformable wherein the first insert is configured for dissipating a force from an impact of an object; and
  a fastener engaged to the shell and selectively engageable to the vehicle for fixedly positioning the shell over the portion of the exterior surface, wherein the shell is configured for protecting the portion of the exterior surface from the impact of the object.

15. The vehicle exterior surface protective device and vehicle combination of claim 14, wherein:
  the shell comprises a plurality of sections, the sections being hingedly interconnected such that the plurality of sections is selectively foldable from a first configuration, wherein the sections are substantially planarly positioned, to a second configuration, wherein at least two of the sections are stacked one upon the other;
  the shell comprises elastomer such that the shell is substantially impermeable to water;
  the shell has a perimeter shaped substantially complementarily to a circumference of the portion of the exterior surface of the vehicle;
  the first insert is bonded to the top of the shell; and
  the second insert comprises foamed elastomer, the second insert is bonded to the first insert and to the bottom of the shell.

16. The vehicle exterior surface protective device and vehicle combination of claim 14, further including:
  a sleeve coupled to and extending outwardly from a perimeter of the shell, the sleeve comprises elastomer such that the sleeve is substantially impermeable to water; and
  the fastener comprising a magnet, the magnet being positioned in the sleeve wherein the magnet is configured for magnetically coupling to a ferromagnetic material adjacent to the portion of the exterior surface of the vehicle for fixedly positioning the shell thereover.

17. The vehicle exterior surface protective device of claim 14, wherein the fastener comprises an adjustable strap, the adjustable strap having a pair of end hooks and a ratchet engaged thereto, wherein each end hook is configured for selectively engaging a respective element of the vehicle, such that the adjustable strap is positioned over the shell, positioning a user for ratcheting the ratchet for tightening the adjustable strap for fixedly positioning the shell over the portion of the exterior surface of the vehicle.

18. The vehicle exterior surface protective device of claim 14, wherein the fastener comprises a fixed strap, the fixed strap being coupled to and extending from the shell, the fixed strap comprising elastomer such that the fixed strap is resiliently stretchable, the fixed strap having a terminal hook coupled thereto distal from the shell, wherein the fixed strap is configured for stretching for positioning the terminal hook for engaging a respective element of the vehicle for fixedly positioning the shell over the portion of the exterior surface of the vehicle.

19. A vehicle exterior surface protective device comprising:
  a shell defining an interior space, the shell being sized such that the shell is configured for covering a portion of an exterior surface of a vehicle, the shell comprising a plurality of sections, the sections being hingedly interconnected such that the plurality of sections is selectively foldable from a first configuration, wherein the sections are substantially planarly positioned, to a second configuration, wherein at least two of the sections are stacked one upon the other, the shell comprising elastomer such that the shell is substantially impermeable to water, the shell having a perimeter shaped substantially complementarily to a circumference of the portion of the exterior surface of the vehicle;
  a sleeve coupled to and extending outwardly from the perimeter of the shell, the sleeve comprising elastomer such that the sleeve is substantially impermeable to water;
  a first insert positioned in the interior space adjacent to a top of the shell, the first insert being resiliently rigid wherein the first insert is configured for resisting impact deformation including impact fracture, the first insert comprising metal, the first insert being bonded to the top of the shell;
  a second insert positioned in the interior space adjacent to a bottom of the shell, the second insert being resiliently deformable wherein the first insert is configured for dissipating a force from an impact of an object, the second insert comprising foamed elastomer, the second insert being bonded to the first insert and the bottom of the shell; and a fastener engaged to the shell and being configured to be selectively engageable to the vehicle for fixedly positioning the shell over the portion of the exterior surface, wherein the shell is configured for protecting the portion of the exterior surface from the impact of the object, the fastener comprising a magnet, the magnet being positioned in the sleeve, wherein the magnet is configured for magnetically coupling to a ferromagnetic material adjacent to the portion of the exterior surface of the vehicle for fixedly positioning the shell thereover, the sleeve extending circumferentially around the perimeter of the shell, wherein the magnet is configured for substantially sealably coupling the shell to the vehicle.

* * * * *